(12) United States Patent
Rosser et al.

(10) Patent No.: US 8,977,492 B1
(45) Date of Patent: Mar. 10, 2015

(54) TEMPORARY, LOCATION-DEPENDENT CLOCK PRESENTATION SYSTEM, DEVICE, AND METHOD

(71) Applicants: Roy L. Rosser, Austin, TX (US); Michael A. Jimenez, Marion, IA (US)

(72) Inventors: Roy L. Rosser, Austin, TX (US); Michael A. Jimenez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/835,085

(22) Filed: Mar. 15, 2013

(51) Int. Cl.
*G06F 17/00* (2006.01)
*G01C 21/20* (2006.01)

(52) U.S. Cl.
CPC ................ *G01C 21/20* (2013.01); *G06F 17/00* (2013.01)
USPC .......................................................... 701/467

(58) Field of Classification Search
CPC ................. G06F 17/00; G01C 21/20
See application file for complete search history.

(56) References Cited

U.S. PATENT DOCUMENTS

2006/0015247 A1* 1/2006 Speer ............................ 701/206

OTHER PUBLICATIONS

Instrument Flying Handbook, 2012, pp. 6-24-6-28, FAA-H-8083-15B, Department of Transportation, F.A.A., Airman Testing Standards Branch, Oklahoma City, OK.
Fatigue in Aviation, OK-07-193, Department of Transportation, F.A.A., Civil Aerospace Medical Institute, Oklahoma City, OK.

* cited by examiner

*Primary Examiner* — John Q Nguyen
*Assistant Examiner* — Michael Kerrigan
(74) *Attorney, Agent, or Firm* — Angel N. Gerdzhikov; Donna P. Suchy; Daniel M. Barbieri

(57) ABSTRACT

Present novel and non-trivial system, device, and method for generating a temporary, pop-up, location-dependent clock to the pilot of an aircraft. A clock generator may be configured to retrieve approach procedure data representative of waypoint location such as the location of a final approach fix; receive navigation data representative aircraft location information; determine the passing of the waypoint inbound to the applicable airport; and perform one repetitive clock operation of a plurality of repetitive clock operations upon the passing of the waypoint, wherein an image data set is generated and provided to one or more display units. The image data set could be representative of (1) a pop-up timer displaying a counting down of time from the manually-initialized, estimated time, or (2) a pop-up stopwatch displaying a counting up of time when the estimated time is not manually initialized.

17 Claims, 7 Drawing Sheets

TEMPORARY, LOCATION-DEPENDENT CLOCK PRESENTATION SYSTEM, DEVICE, AND METHOD

BACKGROUND OF THE INVENTION

1. Field of the Invention

This invention pertains generally to the field of vehicle display units that present navigation information to the user of a vehicle such as the pilot of an aircraft.

2. Description of the Related Art

Aircraft fly in all sorts of weather conditions that can be generally categorized as flight under Visual Meteorological Conditions ("VMC") or Instrument Meteorological Conditions ("IMC"). When operating in VMC or IMC weather conditions, flight may be conducted under Visual Flight Rules ("VFR") or Instrument Flight Rules ("IFR"), respectively. Generally, flight under VFR occurs when a pilot can fly with reference to visual cues located outside the aircraft; when the pilot cannot rely on outside visual cues, e.g., when there is poor visibility, he or she conducts the flight in IMC under IFR.

To assist the pilot when landing on a runway at an airport when flying in IMC, a pilot may perform an instrument approach procedure ("IAP"). The IAP may be categorized as a precision approach procedure or a non-precision approach procedure, each designed with a final approach fix ("FAF") and a missed approach point ("MAP"). The MAP may be considered as a point along the IAP at which time the pilot decides to land the aircraft or execute a missed approach procedure, where such decision may depend upon the pilot's ability to see the runway environment.

The MAP may vary and depend upon the approach procedure being flown. For a precision approach procedure, the MAP may be located at a point along a glide slope at which decision height ("DH") or decision altitude ("DA") is reached. In one type of non-precision approach procedure, the pilot may determine the MAP with a navigational fix or navigational aid ("NAVAID") where the NAVAID facility upon which the IAP is based is located on the airport. In another type of non-precision approach procedure, the MAP may be determined with defined waypoints used in conjunction with a global positioning system ("GPS") or VOR/DME RNAV (which is defined as very high frequency omnidirectional range/distance measuring equipment area navigation).

In another type of non-precision approach procedure where the NAVAID upon which the IAP is based is located away from the airport, the MAP may be determined by timing the IAP when passing the FAF; when performing this type non-precision approach procedure, it is not uncommon for a pilot to forget to time the approach when passing the FAF. Without a timer, the pilot may not know when he or she arrives at the MAP at the correct time when a decision needs to be made. This could lead to a loss of a pilot's situational awareness and increase the risk of experiencing a tragic consequence where, for instance, the aircraft is operating in or near an area of mountainous terrain.

BRIEF SUMMARY OF THE INVENTION

The embodiments disclosed herein present at least one novel and non-trivial system, device, and method for generating a temporary, pop-up, location-dependent clock to the pilot of an aircraft. With the embodiments disclosed herein, a clock may appear momentarily during an IAP phase, displaying either a timer counting down from a pilot's estimate of time or a stopwatch counting up from zero when no estimate is provided.

In one embodiment, a system for generating a temporary, pop-up, location-dependent clock is disclosed. The system may be comprised of a manual input data source, a procedure data source, a navigation data source, a clock generator configured to generate a first or second image data set, and one or more display units. In one embodiment, each display unit could be configured to receive the image data set and present a clock comprised of either a timer counting down or a stopwatch counting up. In another embodiment, the clock may be presented within an indicator corresponding to a navigation aid upon which the procedure is based. In another embodiment, the clock may be presented within the pitch scale of an attitude indicator. In another embodiment, the manual input data source, the procedure data source, the navigation data source, and the clock generator could be integrated into a flight management system. In another embodiment, the manual input data source, the procedure data source, the navigation data source, the clock generator, and a display unit could be integrated into a portable electronic device.

In another embodiment, a device for generating a temporary, pop-up, location-dependent clock is disclosed. The device may be comprised of a clock generator configured to perform the method discussed in the following paragraph. As embodied herein, the clock generator could be comprised of one or more processing units configured or programmed to generate the first or second image data set.

In another embodiment, a method for generating a temporary, pop-up, location-dependent clock is disclosed. The method could be comprised of retrieving procedure data representative of a navigation waypoint such as a final approach fix, receiving navigation data representative aircraft location information, determining the passing of the navigation waypoint, and performing one repetitive clock operation of a plurality of repetitive clock operations upon the passing of the waypoint. One repeating clock operation may be comprised of a count down of time from an estimated time initialized manually, generating an image data set representative of a pop-up timer displaying the counting down of time from the manually-initialized time, and providing the first image data set to one or more display units. If the estimated time is not initialized manually, another repeating clock operation may be comprised of a count up of time from zero, generating an image data set representative of a pop-up stopwatch displaying the counting up of time, and providing the first image data set to one or more display units. In another embodiment, the repetitive clock operation may be inhibited if the procedure is a precision approach procedure and/or includes the use of distance measuring equipment.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
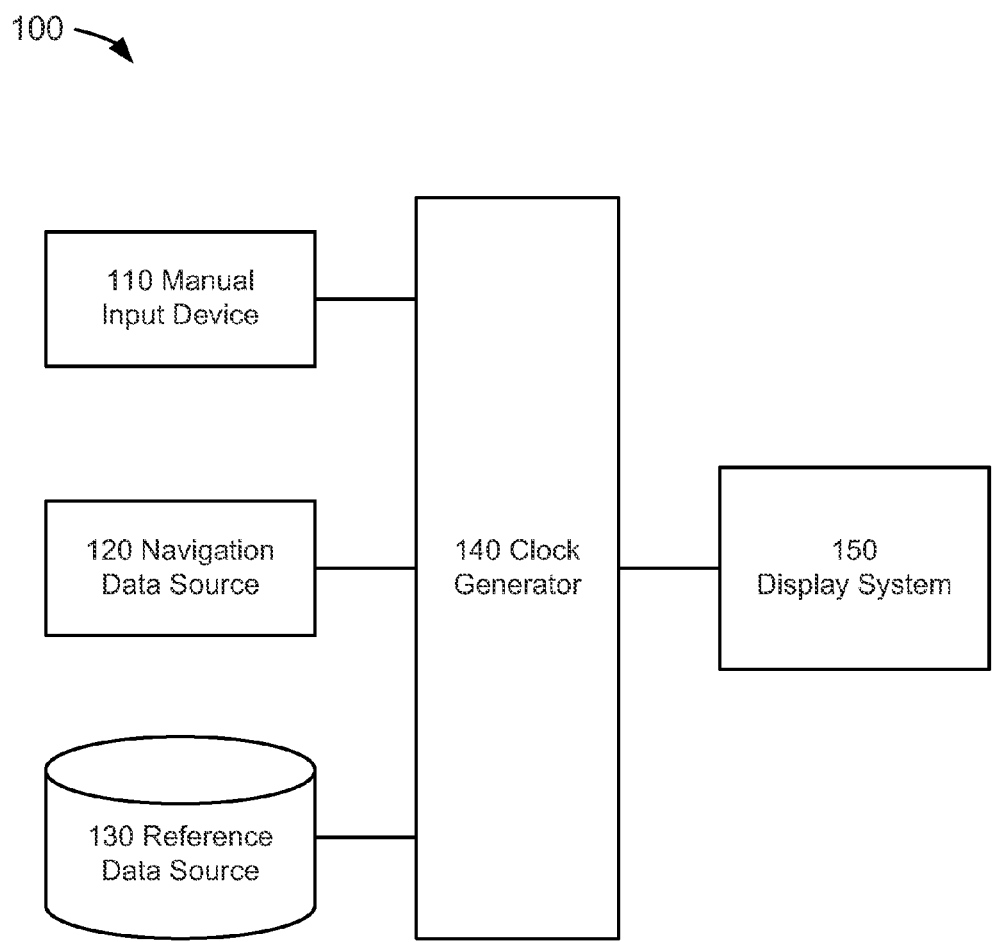
FIG. 1 depicts a block diagram of a temporary, pop-up, location-dependent clock system.

FIG. 1 depicts a location-dependent clock presentation system 100 suitable for implementation of the techniques described herein. The system may be comprised of a manual input device 110, a navigation data source 120, a reference data source 130, a clock generator ("CG") 140, and a display unit(s) 150.

In an embodiment of FIG. 1, the manual input device 110 could comprised of any source for facilitating a viewer's interaction with the information displayed by a display unit. The manual input device 110 may include any device that allows for the selection of time as described below. Such devices could include, but are not limited to, a tactile device (e.g., keyboard, control display unit, cursor control device, stylus, electronic grease pen, handheld device, touch screen device, notebook, tablet, electronic flight bag, etc. . . . ) and/or speech recognition systems. The manual input device 110 could be integrated with a display unit if it is configured to receive pilot input (e.g., handheld device, touch screen device, notebook, tablet, etc. . . . ). As embodied herein, the manual input device 110 may provide input representative of a pilot's input of time to the CG 140 for subsequent processing as discussed herein.

The navigation data source 120 may include, but is not limited to, an air/data system, an attitude heading reference system, an inertial guidance system (or inertial reference system), a radio navigation system, and a global navigation satellite system (or satellite navigation system) such as the global positioning system ("GPS"), all of which are known to those skilled in the art. As embodied herein, the navigation data source 120 could provide navigation data including, but not limited to, data representative of aircraft location and heading information. As embodied herein, the pilot input device 110 (e.g., handheld device, notebook, tablet, etc. . . . ) could be integrated with the navigation data source 120 (e.g., GPS) to receive location information and/or configured to receive location information through a wired data bus and/or wireless network. As embodied herein, navigation data may be provided to the CG 140 for subsequent processing as discussed herein.

In an embodiment of FIG. 1, the reference data source 130 could be comprised of any source of reference point data. The reference data source 130 may include, but is not limited to, a flight navigation database that may be part of a flight management system ("FMS"). Although not limiting to the embodiments disclosed herein, the reference data source 130 could be a database designed to meet the standards published by Aeronautical Radio, Incorporated ("ARINC") in the following document: ARINC Specification 424-18 entitled "Navigations Systems Data Base" ("ARINC 424"), an aviation industry standard known to those skilled in the art.

The flight navigation database may contain records which provide reference data such as, but not limited to, airport data and/or approach data of an instrument approach procedure ("IAP") of an airport. Those skilled in the art understand that approach procedures are comprised of a plurality of waypoints, and data representative of the geographic location of waypoints are included in the navigation reference data source 130. Although the reference points in the following discussion may be drawn to a waypoint of an approach procedure known as a final approach fix ("FAF"), the disclosures herein are not limited to FAFs but may include any point used in an approach procedure having a defined geographic location such as, for example, an initial approach fix.

In an embodiment of FIG. 1, the CG 140 may receive data from various systems including, but not limited to, the manual input device 110, the navigation data source 120, and the reference data source 130. The CG 140 may be operatively coupled to these to facilitate the receiving of input data; as embodied herein, operatively coupled may be considered as interchangeable with electronically coupled. It is not necessary that a direct connection be made; instead, such receiving of input data and providing of output data could be provided through a data bus or through a wireless network. The CG 140 may also be operatively coupled to the display unit(s) 150 to facilitate the providing of data generated by the CG 140.

In an embodiment of FIG. 1, the CG 140 may be representative of any electronic data processing unit or complex of processing units which execute software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The CG 140 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, the CG 140 could be a processor(s) used by or in conjunction with any other system of the aircraft including, but not limited to, a processor(s) associated with the manual input device 110, the navigation data source 120, the reference data source 130, the display unit(s) 150, a synthetic vision system ("SVS"), an enhanced image generated by an enhanced vision system ("EVS"), or a synthetic-enhanced or enhanced synthetic image generated by a combined SVS-EVS, or any combination thereof.

In an embodiment of FIG. 1, the display unit(s) 150 could be comprised of any display unit having a display surface on which an image(s) may be presented to the pilot. The display unit could be, but is not limited to, a Primary Flight Display ("PFD") Unit, Navigation Display ("ND") Unit, Head-Up Display ("HUD") Unit, Head-Down Display ("HDD") Unit, Multi-Purpose Control Display Unit, Engine Indicating and Crew Alerting System Unit, Electronic Centralized Aircraft Monitor Unit, Multi-Function Display, Side Display Units, and/or Data Link Control Display Unit. The display unit(s) may be configured to present one or more display(s) or image(s); as embodied herein, the terms "display" and "image" are interchangeable and treated synonymously.

Figure 2:
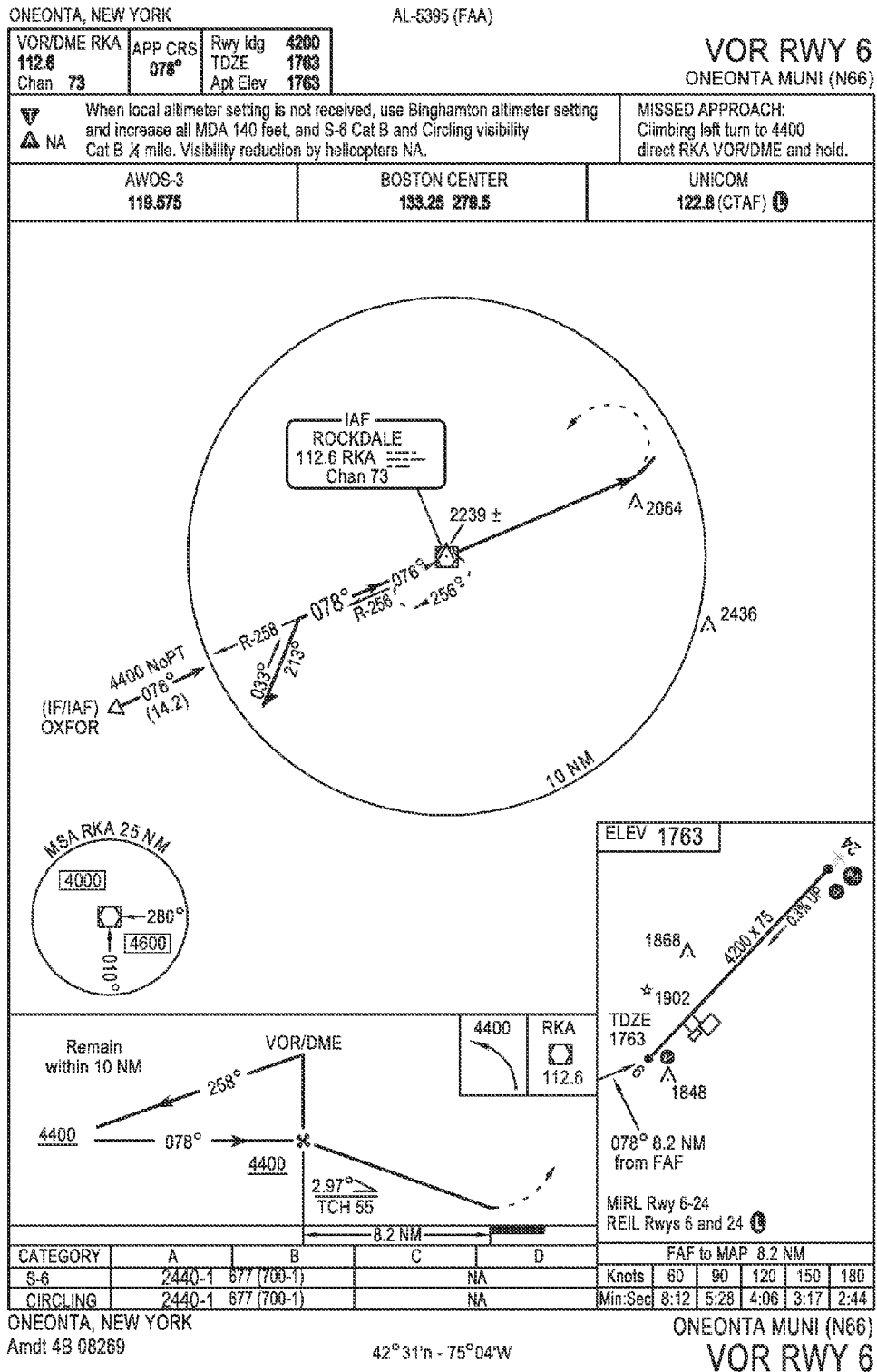
FIG. 2 illustrates a published instrument approach procedure chart of an IAP.

Referring to FIG. 2, an example of a published approach procedure chart ("approach chart") of an IAP is illustrated, one that has been established and approved by the Federal Aviation Administration ("F.A.A.") of the United States ("U.S."). As shown, the approach chart illustrates an IAP defined as the "VOR RWY 6" IAP of the Oneonta Municipal Airport ("N66") located in Oneonta, N.Y., U.S (VOR is defined as Very High Frequency Omnidirectional Range). It should be noted that FIG. 2 is presented for the sole purpose of illustration and are not suitable for navigation.

Each IAP established and approved by the F.A.A. may be a precision IAP or a non-precision IAP. Each precision IAP or a non-precision IAP includes a missed approach point ("MAP"), a point that varies and depends upon the IAP flown. If a visual reference of the runway or its environment is not observed by the pilot at the MAP (or if some other regulatory requirement is not met), the pilot will be required to execute a missed approach procedure; the instructions for performing the missed approach procedure for the N66 VOR RWY 6 IAP are shown in the upper right-hand corner of the approach chart of FIG. 2

For a precision IAP based upon an instrument landing system ("ILS"), the MAP is defined by a decision altitude/ decision height ("DA/DH") along a glide slope. For some non-precision IAPs, where the pilot may determine the MAP by keeping track of time from when the FAF was passed.

Referring to the approach chart of FIG. 2, those skilled in the art will note that the navigation aid upon which the IAP is based in the Rockdale VOR/DME. In addition, the FAF (represented by the symbol resembling a Maltese cross) for the N66 VOR RWY 6 IAP is the Rockdale VOR/DME. The MAP is a point that is 8.2 nautical miles ("NM") from the FAF along the 078 degree radial of the Rockdale VOR/DME.

Because the navigation aid upon which the IAP is based is located away from N66, the pilot may refer to the time and speed table shown in the lower right-hand corner of the approach chart, a table which provides the time required to transit the distance between the FAF and the MAP based on various groundspeeds. If the DME (DME is defined as distance measuring equipment) portion of the navigation aid is inoperative or otherwise unusable, it would not be possible for the pilot to determine the MAP. Instead, the pilot may time the approach upon passing the FAF. Using the time and speed table, the pilot may estimate the time from the FAF to the MAP based upon an estimated ground speed ("GS"). If the GS is estimated at 90 NM per hour ("knots"), then the estimated time is 5 minutes, 28 seconds; if the GS is estimated at 120 knots, then the estimated time is 4 minutes, 6 seconds. If the GS is estimated at 100 knots, then the estimated (and interpolated) time is 4 minutes 33 seconds (rounded off).

The advantages and benefits of the embodiments disclosed herein may be illustrated in FIGS. 3 and 4 by providing a sequence of events in which clocks may be superimposed against images seen by pilots as they fly the IAP. In the discussion that follows, references will be made to images of a VOR indicator and an ADF indicator, both of which are known to those skilled in the art. Although the discussion herein will be drawn to these VOR and ADF indicators configured as shown, those skilled in the art understand that a plurality of other indicators may be used for which the disclosed embodiments may be applied equally. For example, a VOR indicator may be comprised of a HSI indicator (defined as a Horizontal Situation Indicator); similarly, an ADF indicator could be comprised of a fixed-card ADF, a rotatable compass-card ADF, or an RMI indicator (defined as Radio Magnetic Indicator) with one or two needles.

Figure 3A:
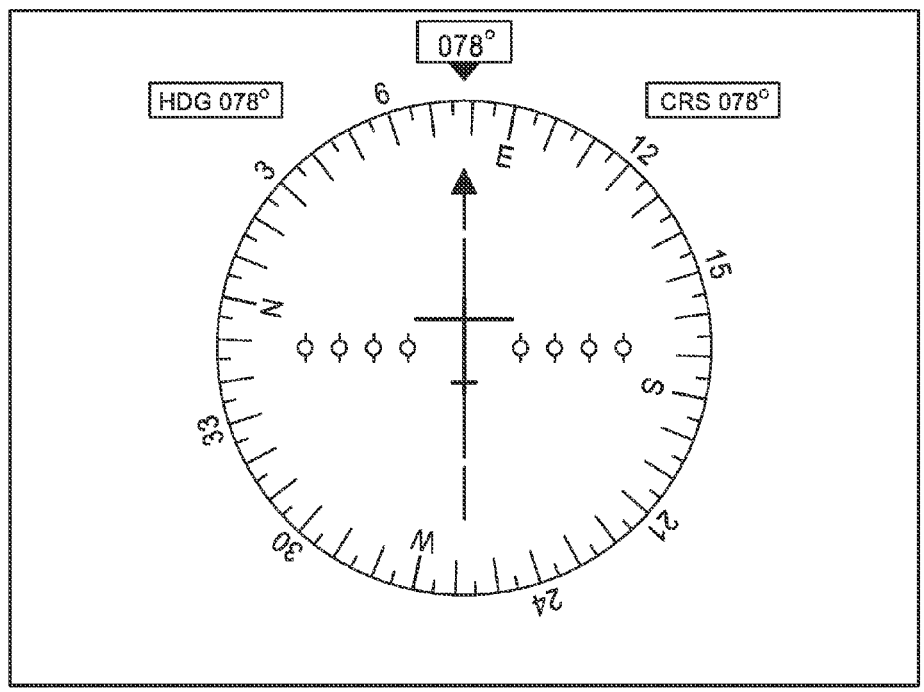
FIG. 3A illustrates a Very high frequency Omnidirectional Range ("VOR") indicator of an aircraft approaching an FAF.
Figure 3B:
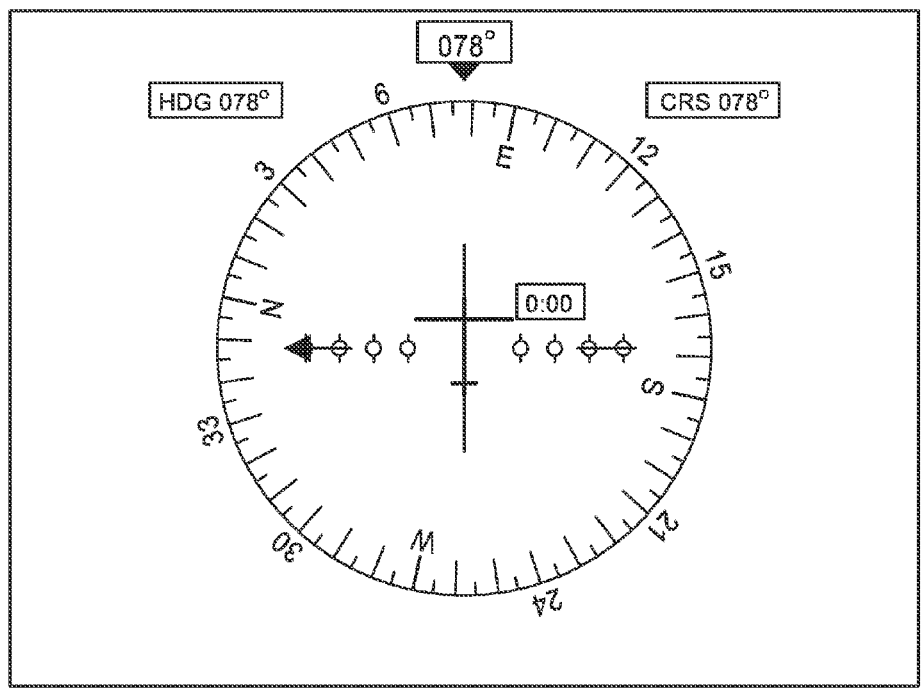
FIG. 3B illustrates the VOR indicator of FIG. 3A as the aircraft passes the FAF at which point a pop-up stopwatch appears.

Referring to FIG. 3A, an image of a VOR indicator comprised of eight deviation dots is shown. For the purpose of illustration, it will be assumed that the pilot is flying the N66 VOR RWY 6 IAP and is approaching Rockdale VOR/DME. A GS as 100 knots has been estimated and a time of 4 minutes 33 seconds has been estimated between the FAF and the MAP; however, in this example, the estimated time has not been entered via the manual input device 110. As shown in FIG. 3B, the head and tail of the needle is "swinging" to the opposite direction, meaning the aircraft is passing the Rockdale VOR/DME (i.e., the FAF). In addition, a stopwatch has "popped up" adjacent to the symbology of the aircraft and begins to count up.

To determine the passing of the FAF, the CG 140 may be programmed to monitor the distance between the aircraft location and the location of the FAF using data provided by the navigation data source 120 and retrieved from the reference data source 130, respectively. When the distance between the two locations stops decreasing and begins to increase, this could indicate the aircraft is passing the FAF. Upon passing the FAF, the CG 140 could be programmed to generate data representative of an image of a clock comprised of a stopwatch and provide the data to the display unit(s) 150, causing the stopwatch to "pop up" and count up.

Figure 3C:
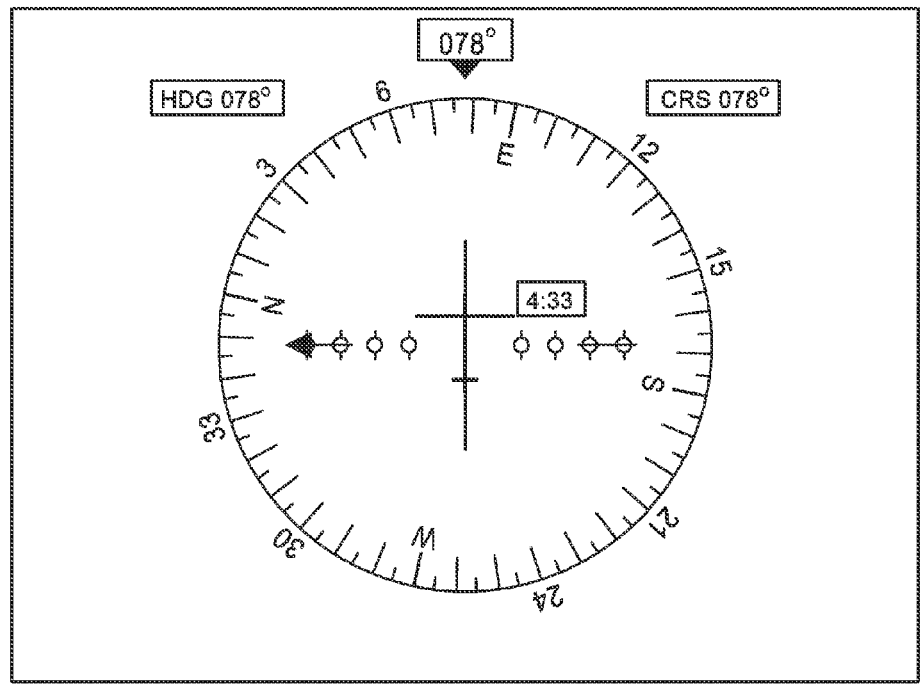
FIG. 3C illustrates the VOR indicator of FIG. 3A as the aircraft passes the FAF at which point a pop-up timer appears displaying a manually-entered time.

In another example, assume that the pilot has entered his or her estimated time of 4:33 and entered it via the manual input device 110. As shown in FIG. 3C, a timer has appeared with the time entered by the pilot upon passing the FAF. The time could count down until it reaches zero or an action is taken to remove it. Upon passing the FAF, the CG 140 could be programmed to generate data representative of an image of a clock comprised of a timer and provide the data to the display unit(s) 150, causing the timer to "pop up" and count down.

As the time approaches zero, the timer could be made more conspicuous by changing its appearance. For the purpose of illustration and not of limitation, as the timer reaches a first threshold (e.g., 0:20), the appearance of the timer could adopt a cautionary tone, where the color of the time or timer could change to amber or yellow and/or the timer could begin to displayed intermittently (i.e., begin blinking) at a set rate. As the timer reaches a second threshold (e.g., 0:10), the appearance of the timer could adopt a warning tone, where the color of the time or timer could change to red and/or be displayed intermittently at a faster rate.

Figure 4A:
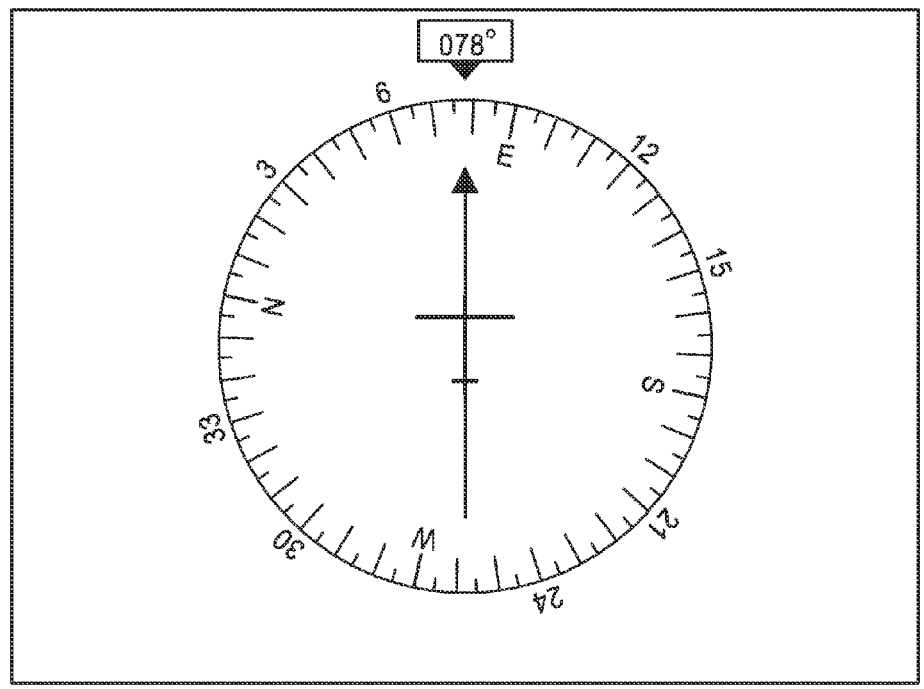
FIG. 4A illustrates an automatic direction finder ("ADF") indicator of an aircraft approaching an FAF.
Figure 4B:
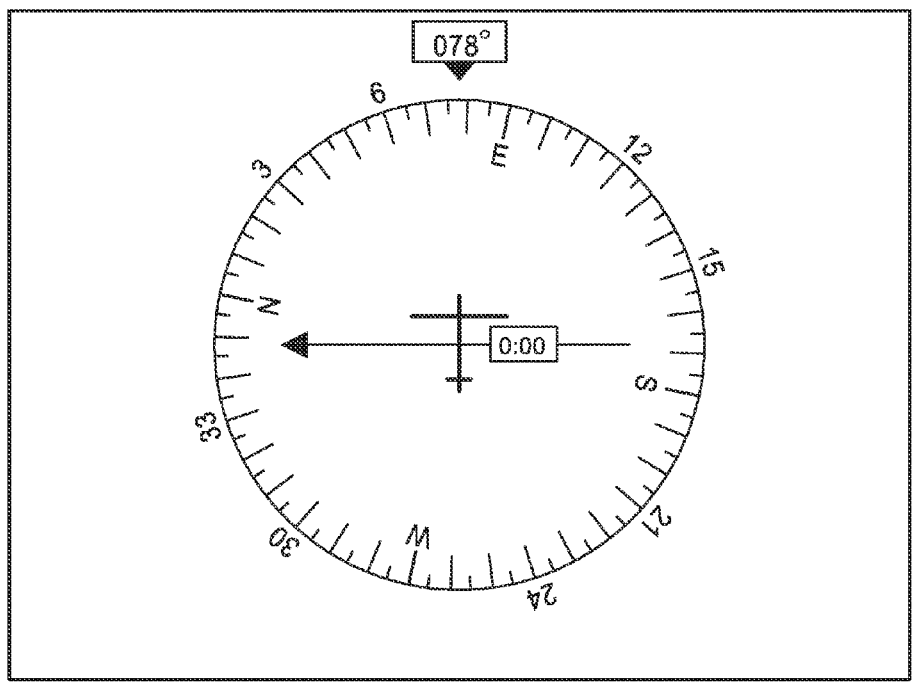
FIG. 4B illustrates the ADF indicator of FIG. 4A as the aircraft passes the FAF at which point a pop-up stopwatch appears.

Referring to FIG. 4A, an image of an ADF indicator (specifically, a rotatable compass-card ADF) is shown. For the purpose of illustration, it will be assumed that the pilot is flying an IAP based upon a navigation aid comprised of a Non-Directional Beacon ("NDB"), and the aircraft is approaching the NDB which will be considered the FAF in this example. Again, a GS of 100 knots and a time of 4 minutes 33 seconds have been estimated; however, in this example, the estimated time has not been entered via the manual input device 110. As shown in FIG. 4B, the needle is "swinging" to the opposite direction, meaning the aircraft is passing the NDB (i.e., the FAF). In addition, a stopwatch has "popped up" adjacent to the symbology of the aircraft and begins to count up. Upon passing the FAF, the CG 140 could be programmed to generate data representative of an image of a clock comprised of a stopwatch and provide the data to the display unit(s) 150, causing the stopwatch to "pop up" and count up.

Figure 4C:
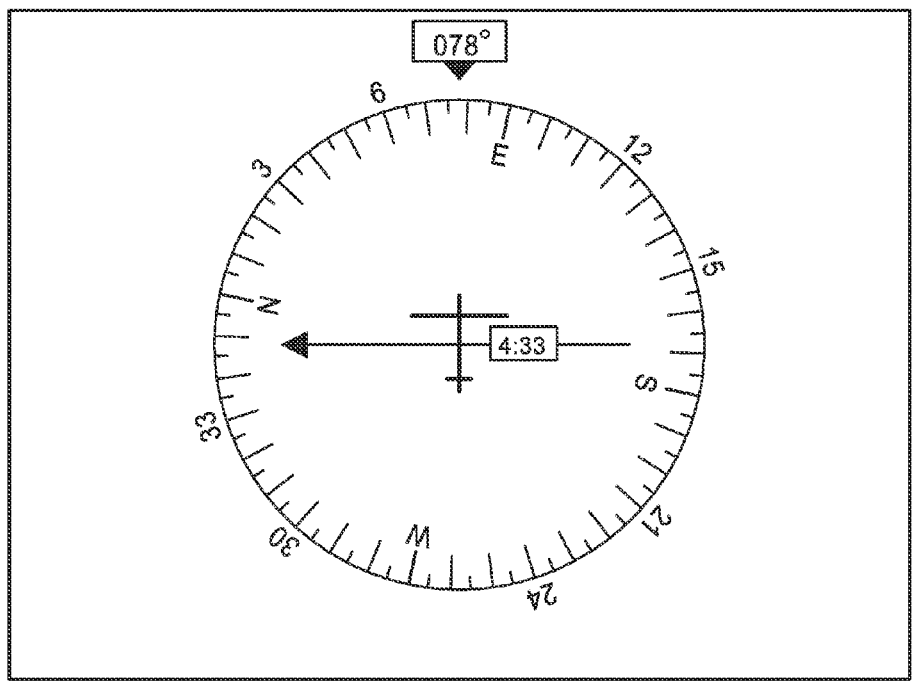
FIG. 4C illustrates the ADF indicator of FIG. 4A as the aircraft passes the FAF at which point a pop-up timer appears displaying a manually-entered time.

In another example, assume that the pilot has entered his or her estimated time of 4:33 and entered it via the manual input device 110. As shown in FIG. 4C, a timer has appeared with the time entered by the pilot upon passing the FAF. The time could count down until it reaches zero or an action is taken to remove it. Upon passing the FAF, the CG 140 could be programmed to generate data representative of an image of a clock comprised of a timer and provide the data to the display unit(s) 150, causing the timer to "pop up" and count down.

Figure 5A:
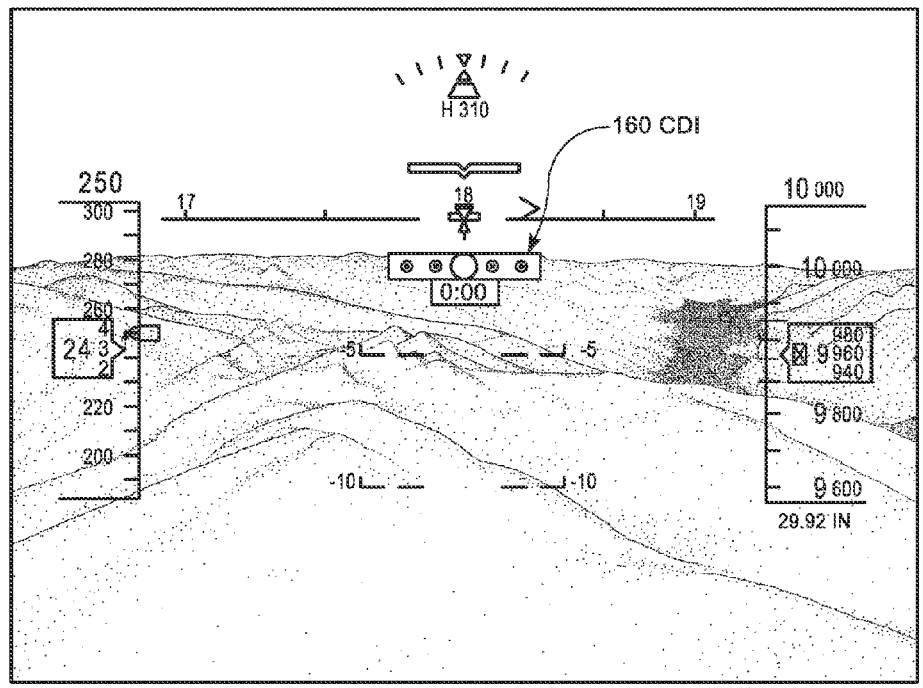
FIG. 5A illustrates an aircraft passing an FAF at which point a pop-up stopwatch within an egocentric image appears.
Figure 5B:
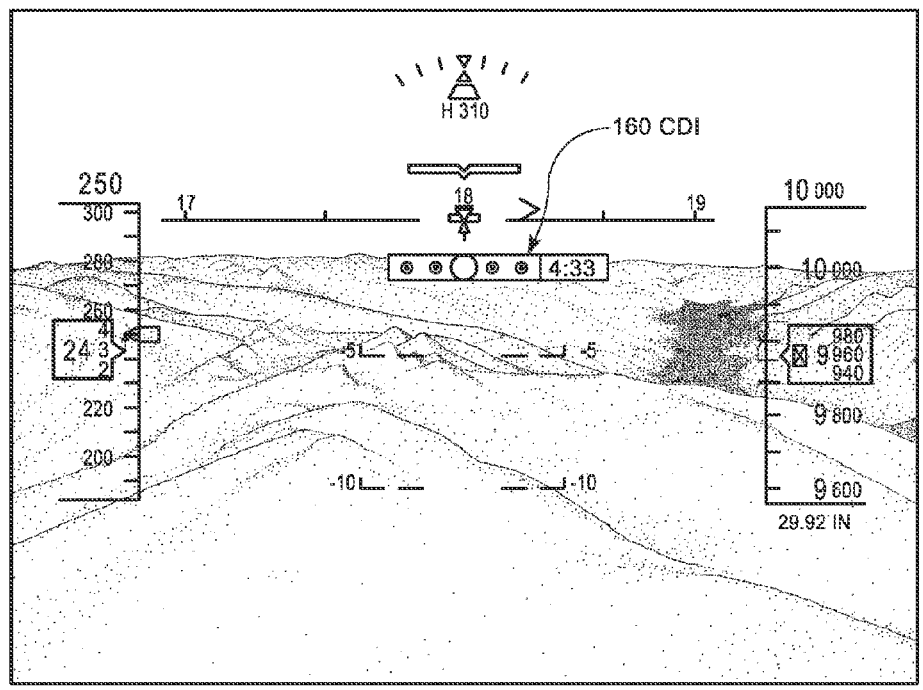
FIG. 5B illustrates an aircraft passing an FAF at which point a pop-up time within an egocentric image appears displaying a manually-entered time.

Referring to FIGS. 5A and 5B, an image comprised of a four-dot course deviation indicator ("CDI") 160 and "basic T" indicators (i.e., airspeed, attitude, altitude, and heading) are superimposed against an egocentric, three-dimensional perspective of a scene located outside the aircraft; although the discussion will be drawn to a three-dimensional image, the embodiments herein may include an egocentric, two-dimensional image. Here, the CDI 160 is centered horizontally within the pitch attitude indicator and in between the zero and minus five degrees marks of the pitch scale. It is below the heading indicator, to the right of the airspeed indicator, and to the left of the altitude indicator. Similar to the eight-dot CDIs of the VOR indicators of FIGS. 3A through 3C, those skilled in the art understand the dot deviation indications may be employed in IAPs including a VOR IAP and a localizer ("LOC") IAP for which a VOR and an ILS are considered the primary navigation aids, respectively. For the CDIs of FIGS. 5A and 5B, the large circle (shown in the center of the CDI 160) is located in the center if the aircraft is on course, or it travels to the left or right of the center when as the aircraft flies to the left or right of course, respectively.

Referring to FIGS. 5A and 5B, assume a clock is not visually present prior to passing the FAF. As shown in FIG. 5A, a stopwatch may "pop up" upon passing the FAF and begin to count up if the pilot has no manually entered a time; similarly, as shown in FIG. 5B, a timer may "pop up" upon passing the FAF and begin to count down when a time has been entered manually.

Figure 6:
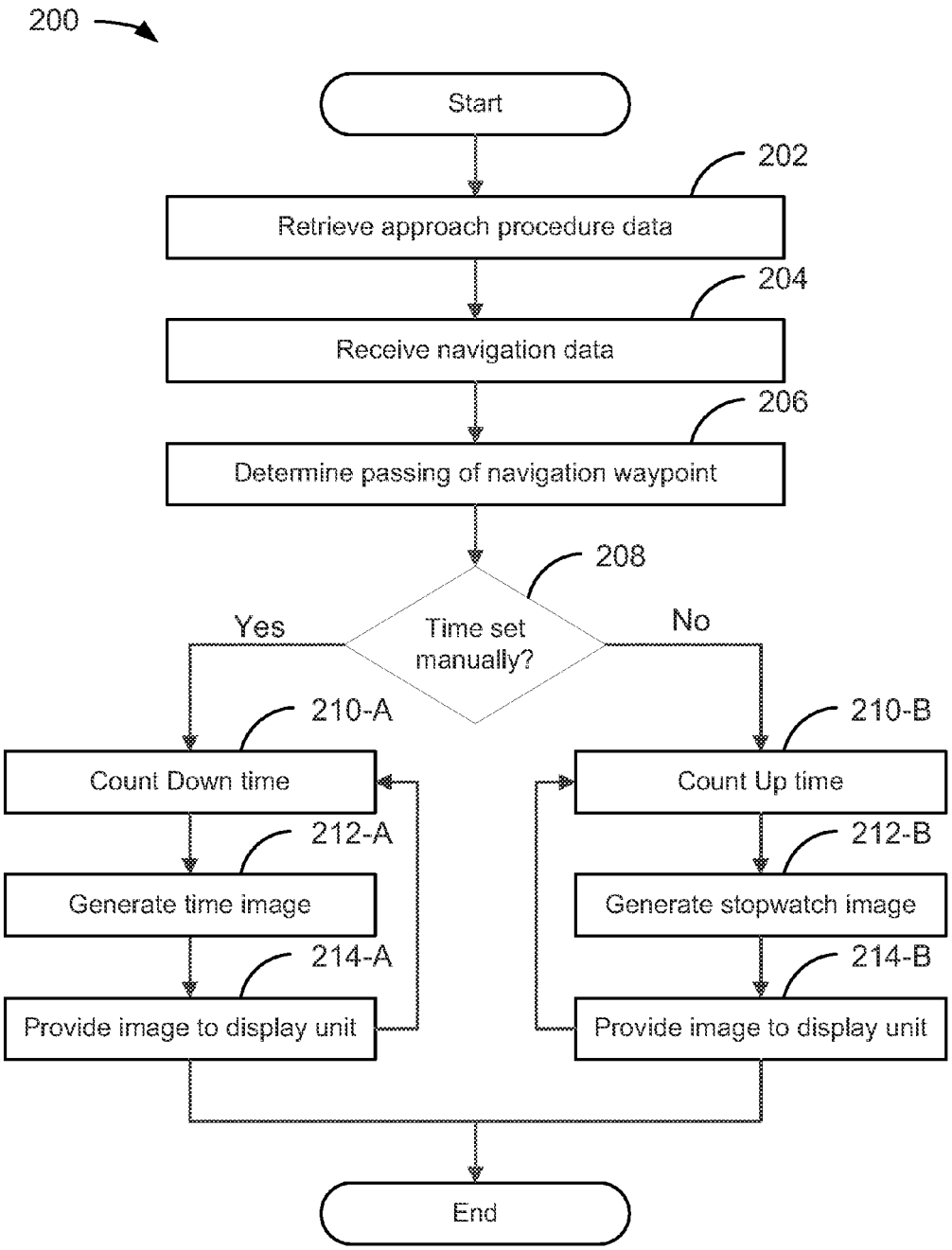
FIG. 6 provides a flowchart illustrating a method for generating a temporary, pop-up, location-dependent clock.

FIG. 6 depicts flowchart 200 providing an example for presenting a temporary, pop-up, location-dependent clock to the pilot of an aircraft, where the CG 140 may be programmed or configured with instructions corresponding to the following modules. As embodied herein, the CG 140 may be comprised of one or more processors of the FMS and/or the display unit(s) 150. Also, the CG 140 may be a processor of a module such as, but not limited to, a printed circuit card having one or more input interfaces to facilitate data communications with the CG 140, i.e., the receiving and providing of data. As necessary for the accomplishment of the following modules embodied in FIG. 6, the receiving of data is synonymous and/or interchangeable with the retrieval of data, and the providing of data is synonymous and/or interchangeable with the making available or supplying of data.

The flowchart 200 begins with module 202 with the retrieving of approach procedure data representative of at least location information of a waypoint. The waypoint could be comprised of the location of the FAF of an IAP applicable to an airport. As embodied herein, this approach data could be retrieved from a flight navigation database at any time before or during a flight.

The flowchart continues with module 204 with the receiving of navigation data representative of at least aircraft location information. In one embodiment, the navigation data could include data representative of ground track information if such information is not derived from location information.

The flowchart continues with module 206 with the determining of the passing of the FAF inbound to the applicable airport as a function of the approach data and the navigation data. The method continues with module 208 with the performing of one repetitive clock operation of a plurality of repetitive clock operations. The repetitive clock operation may depend on whether a time has been manually entered and may be commenced upon the passing of the final approach fix.

If the time has been entered, the method continues with module 210-A with the counting down of time from the entered time. The method continues with module 212-A with the generating of an image data set representative of a timer displaying the time as it is being counted down. The method continues with module 214-A with the providing of the image data set to one or more display units. The method loops back to module 210-A, where it (i.e., the A loop) may be repeated, for example, until the time reaches zero or it is otherwise halted (e.g., the pilot stops the timer).

In an embodiment in which a time is not manually entered, the method continues with module 210-B with the counting up of time from zero. The method continues with module 212-B with the generating of an image data set representative of a stopwatch displaying time as it is being counted up from zero. The method continues with module 214-B with the providing of the image data set to one or more display units. The method loops back to module 210-B, where it (i.e., the B loop) may be repeated, for example, until the time reaches a preconfigured time-out setting or it is otherwise halted (e.g., the pilot stops the stopwatch).

As a result of the performance of either the A loop or the B loop, a clock comprised of either the timer or the stopwatch pops up into the pilot's view upon the passing of the FAF and begins to either count time down or up, respectively. Then, the method of flowchart 200 proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting a temporary, location-dependent clock to the pilot of an aircraft, said system comprising:
   a manual input device;
   a source of procedure data;
   a source of navigation data;
   a clock generator configured to
      retrieve procedure data representative of at least location information for one waypoint of a procedure,
      receive navigation data representative of at least aircraft location information,
      determine the passing of the waypoint as a function of the procedure data and the navigation data,
      perform one repetitive clock operation of a plurality of repetitive clock operations in response to the passing of the waypoint, where a first repetitive clock operation is configured to
count down time from a time initialized manually via the manual input device,
generate a first image data set representative of an image of a timer displaying time as the time is being counted down, and
provide the first image data set to at least one display unit, or
a second repetitive clock operation is configured to
count up time from a time of zero,
generate a second image data set representative of an image of a stopwatch displaying time as the time is being counted up, and
provide the second image data set to at least one display unit, where
the performance of either the first repetitive clock operation or the second repetitive clock operation is dependent upon whether a time is initialized manually via the manual input device prior to arriving at the waypoint, and
the image of the timer or the image of the stopwatch becomes visible and pops up into view in response to the passing of the waypoint; and
at least one display unit configured to
receive the first image data set or the second image data set, and
present the image represented in the first image data set or the second image data set, whereby
the passing of the waypoint is identified when
the image of a timer or the image of a stopwatch
becomes visible,
pops up into view, and
begins to either count time down or up, respectively.

2. The system of claim 1, wherein the waypoint is a final approach fix of an instrument approach procedure of an airport.

3. The system of claim 1, wherein the performance of the one repetitive clock operation is inhibited if the procedure
is a precision approach procedure, or
includes the use of distance measuring equipment.

4. The system of claim 1, wherein the image of a timer or the image of a stopwatch is presented within an indicator corresponding to a navigation aid upon which the procedure is based.

5. The system of claim 1, wherein the image of a timer or the image of a stopwatch is presented within the pitch scale of an attitude indicator.

6. The system of claim 1, wherein a plurality of the following are integrated into a flight management system:
the manual input device,
the source of approach procedure data,
the source of navigation data, and
the clock generator.

7. The system of claim 1, wherein the following are integrated into a portable electronic device:
the manual input device,
the source of approach procedure data,
the source of navigation data,
the clock generator, and
the display system.

8. A device for presenting a temporary, location-dependent clock to the pilot of an aircraft, said device comprising: a clock generator configured to retrieve procedure data representative of at least location information for one waypoint of a procedure; receive navigation data representative of at least aircraft location information; determine the passing of the waypoint as a function of the procedure data and the navigation data; and perform one repetitive clock operation of a plurality of repetitive clock operations in response to the passing of the waypoint, where a first repetitive clock operation is configured to count down time from a time initialized manually via the manual input device, generate a first image data set representative of an image of a timer displaying time as the time is being counted down, and provide the first image data set to at least one display unit, or a second repetitive clock operation is configured to count up time from a time of zero, generate a second image data set representative of an image of a stopwatch displaying time as the time is being counted up, and provide the second image data set to at least one display unit, where the performance of either the first repetitive clock operation or the second repetitive clock operation is dependent upon whether a time is initialized manually via the manual input device prior to arriving at the waypoint, and the image of the timer or the image of the stopwatch becomes visible and pops up into view in response to the passing of the waypoint, such that the image represented in the first image data set or the second image data set is presented on at least one display unit, whereby the passing of the waypoint is identified when the image of a timer or the image of a stopwatch becomes visible, pops up into view on at least one display unit, and begins to either count time down or up, respectively.

9. The device of claim 8, wherein the waypoint is a final approach fix of an instrument approach procedure of an airport.

10. The device of claim 8, wherein the performance of the one repetitive clock operation is inhibited if the procedure
is a precision approach procedure, or
includes the use of distance measuring equipment.

11. The device of claim 8, wherein the image of a timer or the image of a stopwatch is presented within an indicator corresponding to a navigation aid upon which the procedure is based.

12. The device of claim 8, wherein the image of a timer or the image of a stopwatch is presented within the pitch scale of an attitude indicator.

13. A method for presenting a temporary, location-dependent clock to the pilot of an aircraft, said method comprising: retrieving procedure data representative of at least location information for one waypoint of a procedure; receiving navigation data representative of at least aircraft location information; determining the passing of the waypoint as a function of the procedure data and the navigation data; and performing one repetitive clock operation of a plurality of repetitive clock operations in response to the passing of the waypoint, where a first repetitive clock operation configured for counting down time from a time initialized manually via a manual input device, generating a first image data set representative of an image of a timer displaying time as the time is being counted down, and providing the first image data set to at least one display unit, or a second repetitive clock operation configured for counting up time from a time of zero, generating a second image data set representative of an image of a stopwatch displaying time as the time is being counted up, and providing the second image data set to at least one display unit, where the performance of either the first repetitive clock operation or the second repetitive clock operation is dependent upon whether a time is initialized manually via the manual input device prior to arriving at the waypoint, and the image of the timer or the image of the stopwatch becomes visible and pops up into view in response to the passing of the waypoint, such that the image represented in the first image data set or the second image data set is presented on at least one display unit, whereby the passing of the waypoint is identified when the image of a timer or the image of a stopwatch becomes visible, pops up into view on at least one display unit, and begins to either count time down or up, respectively.

14. The method of claim 13, wherein the waypoint is a final approach fix of an instrument approach procedure of an airport.

15. The method of claim 13, wherein the performance of the one repetitive clock operation is inhibited if the procedure
   is a precision approach procedure, or
   includes the use of distance measuring equipment.

16. The method of claim 13, wherein the image of a timer or the image of a stopwatch is presented within an indicator corresponding to a navigation aid upon which the procedure is based.

17. The method of claim 13, wherein the image of a timer or the image of a stopwatch is presented within the pitch scale of an attitude indicator.

* * * * *